Patented Dec. 11, 1934

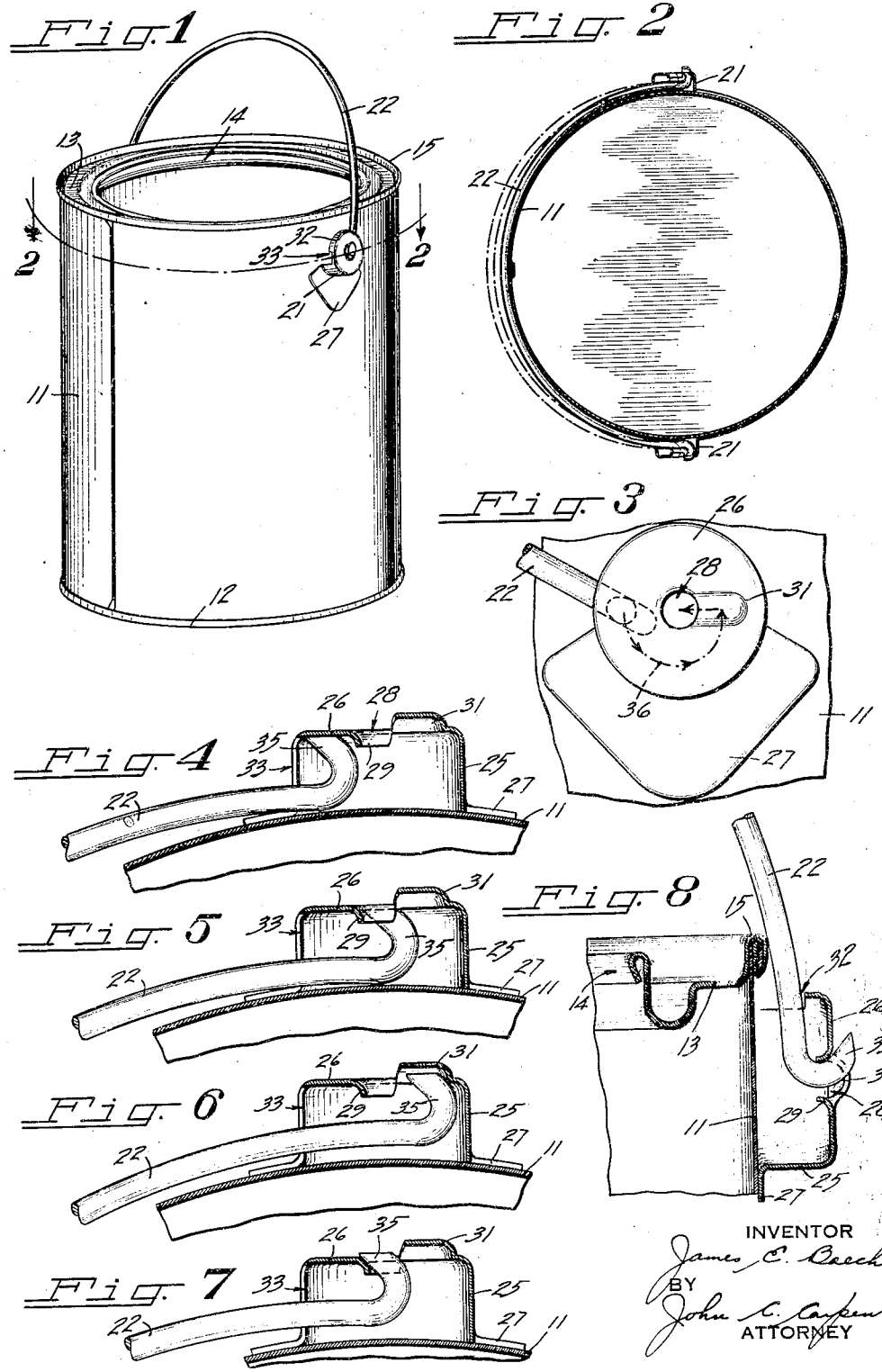

1,983,525

UNITED STATES PATENT OFFICE 1,983,525

BAIL CONTAINER

James E. Baechle, River Forest, Ill., assignor to American Can Company, New York, N. Y., a corporation of New Jersey Application July 15, 1931, Serial No. 550,960

10 Claims. (Cl. 220—91)

The present invention relates in general to bail containers and has for a principal object the provision of a container having an attached bail, parts of the container and bail being formed and arranged to permit easy assembly without likelihood of accidental detachment, the bail being pivotally movable into container carrying and into collapsed or non-carrying positions.

An important object of the invention is the provision of a bail container which may be rolled or otherwise conveyed in the ordinary can runway or chute without interference from the bail.

An important object of the invention is the provision of a container of the character described embodying an improved form of bail ear into which the bail is easily inserted and from which the inserted bail cannot become accidentally displaced.

A further important object of the invention is the provision of a bail ear for a bail container which not only allows easy assembly of bail and bail ear but one which efficiently cooperates with the bail to hold it in either a container carrying position or in a collapsed position at the side of the container.

Numerous other objects of the invention will be apparent as it is better understood from the following description, which, taken in connection with the accompanying drawing, discloses a preferred embodiment thereof.

Referring to the drawing:

Figure 1 is a perspective view of a bail container embodying the present invention and illustrating the assembled bail in container carrying position;

Fig. 2 is a plan sectional view taken substantially along the line 2—2 in Fig. 1 and illustrating the bail in its collapsed or non-carrying position;

Fig. 3 is an enlarged front elevation of a bail ear;

Figs. 4, 5, 6 and 7 are enlarged transverse sectional views taken through one of the bail ears and showing an end of the bail in different inserted positions within the ear; and Fig. 8 is an enlarged fragmentary vertical section through the container and ear illustrating the bail in container carrying position.

For the purpose of exemplifying the present invention, there is shown in the drawing a bail container comprising a container body 11 having a bottom end 12 and a top end 13 provided with a filling and discharge opening 14. The bottom and top ends 12, 13 may be united with the container body 11 in suitable manner as by the usual double seam 15 (Fig. 8). While a top end 13 having an opening 14 is illustrated as a preferred form such a top end can be entirely dispensed with and the body 11 left with a full opening.

A pair of bail ears 21 are provided, each ear being permanently secured to the outer wall of the body 11 in any suitable manner, being disposed on opposite sides of the body (Fig. 2). A bail 22 is also provided, having pivotal connection with the ears 21 and by which the container may be carried. This bail has different positions relative to the container, these being a vertical or carrying position and a collapsed position. In this latter position the bail substantially engages the outer wall of the body 11, as illustrated in Fig. 2, and the container, with this adjustment of the bail may be rolled or otherwise moved through a can conveyor, runway or the like or it may be passed through a can labeling apparatus without interference from the bail.

Each bail ear 21 is formed to provide easy assembly of the bail with the container but after assembly, accidental detachment of bail and ears is effectively prevented by reason of the construction of the bail and the ears. Each ear 21 (Fig. 4) is provided with a cylindrical wall 25 which merges into an outer face or wall 26, the cylindrical wall being also connected with a downwardly extending wall part 27 providing a foot for engagement with the wall of the container. This foot 27 may be secured to the container wall by spot welding, by soldering or by other suitable connecting medium.

A pivot opening 28 extends through and is formed centrally of the wall 26, this opening being partially surrounded by an inwardly projecting skirt 29. A part of the face 26 adjacent the opening 28 is pressed outwardly to provide a radially disposed bail end pocket 31. The cylindrical wall 25, along its peripheral edge and adjacent the wall of the container body 11, is preferably cut away to provide a clearance slot 32 which extends through an arc of somewhat over 90°. The bail ear edge of this slot 32 is a sufficient distance away from the body wall 11 to allow for movement of the bail 22 as it pivots relative to the container between vertical carrying and horizontal collapsed positions. An inserting slot 33 is also formed in the cylindrical wall 25 of the ear, this slot being a lateral enlargement of the lower end of the slot 32 and affording a wider space between the bail ear edge of the wall of the body for permitting insertion of the bail for assembly with the ear.

The bail 22 is preferably provided with hooked ends 35, an end being insertable through the inserting slot 33 (Fig. 4) of an ear 21. After this hooked end 35 has been moved through the slot 33 into the interior of the hollow, cylindrical ear body, it is then moved in a curved path, (indicated by the dot and dash line 36 in Fig. 3), around the inside of the wall into position directly beneath the end pocket 31. This circular movement of the bail end during insertion avoids interference with the depending skirt 29 (Fig. 5). As soon as the end 35 of the inserted bail 22 is brought to its inserted position beneath the pocket 31, the spring of the metal of the bail lifts the end slightly so that it projects into the pocket 31, as illustrated in Fig. 6.

In this inserted position the ends of the bail are not yet in pivotal position within the ears and the major part of the bail rests closely against the outer wall of the body 11 (Fig. 2). When in this position the bail container may be rolled through the usual container runways or through chutes connected with suitable machines, as for example labeling machines. After the bail is moved into carrying position, as will be later explained, it can be brought back into this inserted or collapsed position at any time. In such position, it is sufficiently close to the upper seam 15 to be protected by the seam. The bail is substantially locked in its collapsed position by a horizontal movement which brings it into close position alongside of the container body wall, where it offers the minimum of interference in any rolling movement.

To bring the bail into use it is partially drawn away from the wall of the container and its hooked ends 35 are moved into the pivot openings 28 and into engagement with the depending skirts 29. The dot and dash lines in Fig. 2 illustrate this position of the bail. The bail is now raised into its vertical container carrying position.

In this lifting movement the bail engages and rides against opposite sides of the double seam 15 (Fig. 8) this action spreading the lower ends of the bail and forcibly moving its hooked ends 35 further into pivotal engagement within the pivot slots 28. This doubly insures full engagement between bail and bail ears. It will be observed that the bail ends are prevented from coming out of the ears by the skirt portions 29 partially surrounding each pivot opening.

The inserted bail at all times moves in the clearance slots 32 of the ears 21, as previously described and when in carrying position the friction of the bail against the seam 15 holds it upright. It may easily be moved into collapsed position, however, (Fig. 2) by first pivoting it into substantially horizontal position and then sliding it inwardly against the wall of the container body. The hooked bail ends 35 then move out of their pivot openings 28 and into the bail end pockets 31 where they are locked against any pivotal movement.

It is thought that the invention and many of its attendant advantages will be understood from the foregoing description, and it will be apparent that various changes may be made in the form, construction and arrangement of the parts, without departing from the spirit and scope of the invention or sacrificing all of its material advantages, the form hereinbefore described being merely a preferred embodiment thereof.

I claim:

1. A container comprising a body, bail ears permanently secured on opposite sides of said body and having pivot openings and bail slots, said slots being formed in the peripheral contour of the bail ears, and a bail having outwardly hooked ends adapted for insertion through said slots and into said pivot openings, said bail when pivotally engaged in said ears with its hooked ends in said pivot openings affording a carrying handle for said container and when moved to position against said container wall and with its hooked ends out of said pivot openings affording a collapsed, locked and non-carrying bail, the bail ears having means within the same to deflect the hooks into the pivot openings and to obstruct the withdrawal of the hooked ends radially from the bail ears.

2. A container comprising a body, bail ears permanently secured on opposite sides of said body and having pivot openings, bail end pockets and bail slots, said slots being formed in the peripheral contour of the bail ears, and a bail having hooked ends adapted for insertion through said slots, through said pockets and into said pivot openings, said bail having a container carrying position with its hooked ends pivotally engaging said pivot openings and a collapsed position with its hooked ends in said pockets and with the bail closely engaging the wall of said container body.

3. A container comprising a body, bail ears permanently secured on opposite sides of said body and having pivot openings, bail end pockets and bail slots, a bail having hooked ends adapted for insertion through said slots, through said pockets and into said pivot openings, said bail having a container carrying position with its hooked ends pivotally engaging said pivot openings and a collapsed position with its hooked ends in said pockets and with the bail closely engaging the wall of said container body, and means associated with said container body for spreading the hooked ends of said bail and holding them in their pivot openings when the bail is in carrying position.

4. A container comprising a body, bail ears permanently secured thereto and having pivot openings formed in their outer faces and inserting slots formed in their peripheral walls, each opening being partially surrounded by an inwardly extending skirt, and a bail having outwardly hooked ends adapted for insertion into said slots and movable, when inserted, around said skirt portions and into said pivot openings said bail having pivotal movement in said pivot openings and into position for container carrying, said skirt portions preventing accidental detachment of said bail from said ears.

5. A container comprising a body, bail ears permanently secured to said body and having pivot openings formed in their outer faces and inserting slots formed in their peripheral walls, said side walls being cut away adjacent said container body wall to provide clearance slots, and a bail having hooked ends adapted for insertion through said inserting slots and into said pivot openings, said bail moving in said clearance slots while pivoting on said ears.

6. A bail ear for a container comprising a hollow cylindrical body, and an outer face having a pivot opening for a carrying bail, the cylindrical wall of said body having a clearance slot to permit movement of the bail in and out of the pivot opening and into and out of container carrying position.

7. A bail ear for a container comprising a hollow cylindrical body and an outer face having a pivot opening for a carrying bail, the cylindrical wall of said body having a clearance slot to permit pivotal movement of the bail in and out of the pivot opening and into and out of container carrying position, and a bail passing inward through the slot and thence outwardly to engage the pivot opening, said cylindrical wall also having an inserting slot through which the end of the bail is inserted during its assembly with said ear and during its positioning into said pivot opening.

8. In a bail-ear construction for pails and the like the combination of hollow ears, and a hooked bail adapted for pivotal connection with said ears, each of said ears having a slot for the insertion of the hooked end of the bail, and a pivot opening, and a skirt around which the hooked end is deflected in moving it to the pivot opening and a pocket beyond said skirt leading to the pivot opening, whereby the bail may be confined with its middle portion against the pail, and may be assembled in operative hooked connection with the ears.

9. A container comprising a body, bail ears permanently secured on opposite sides of said body and having pivot openings and bail slots, said slots containing the bail ends and being formed in the peripheral contour of the bail ears and extending for about a quarter of said contour to the top of the ear, and a bail having hooked ends adapted for insertion through said slots and into said pivot openings and horizontally movable as to its ends within the ears to bring the middle part of the bail against the side of the container, said bail when pivotally engaged in said ears affording a carrying handle for said container.

10. A container comprising a body, bail ears permanently secured on opposite sides of said body and having pivot openings and bail slots, said slots containing the bail ends and being formed in the peripheral contour of the bail ears and extending for about a quarter of said contour to the top of the ear, a bail having hooked ends adapted for insertion through said slots and into said pivot openings, said hooked ends of the bail being movable within the bail ears and the bail working in said slots, whereby the bail may have a container carrying position with its hooked ends pivotally engaging said pivot openings and a collapsed position with its hooked ends out of said openings, and means for preventing accidental disengagement of said bail and said ears.

JAMES E. BAECHLE.